United States Patent [19]

Naimer

[11] Patent Number: 4,623,967
[45] Date of Patent: Nov. 18, 1986

[54] COMPUTER-CONTROLLED SWITCHING APPARATUS

[76] Inventor: Hubert L. Naimer, Nuvola Bianca, CH-6612 Ascona, Switzerland

[21] Appl. No.: 513,814

[22] Filed: Jul. 15, 1983

[30] Foreign Application Priority Data

Jul. 29, 1982 [AT] Austria .................. 2930/82

[51] Int. Cl.⁴ ............... G08B 21/00; H02H 3/08; G06F 15/56
[52] U.S. Cl. ................... 364/483; 340/664; 361/24; 361/31; 361/93
[58] Field of Search .......... 340/664; 361/24, 31, 361/93; 364/480, 481, 483, 550

[56] References Cited

U.S. PATENT DOCUMENTS 3,875,464  4/1975  Gary et al. .................. 361/31
4,077,061  2/1978  Johnston et al. ............. 364/483
4,319,298  3/1982  Davis et al. ................. 361/24
4,335,413  6/1982  Engel et al. ................. 361/93
4,467,260  8/1984  Mallick, Jr. et al. .......... 361/24 X
4,544,982  10/1985  Boothman et al. ............. 361/31 X Primary Examiner—Felix D. Gruber
Assistant Examiner—Edward R. Cosimano
Attorney, Agent, or Firm—Kurt Kelman

[57] ABSTRACT

A computer-controlled switching apparatus for controlling power switching elements, wherein a microprocessor is connected by way of analog-digital converter means to at least one sensor for detecting the current consumption of the apparatus to be monitored, for example a motor or the like, and sequentially calculates characteristic data from the detected values, in accordance with various models, and compares said detected values to preselectible limit values, wherein the microprocessor includes a coding means which outputs the calculated values, with an address coding, by way of a transmission path, to a display means having a decoder.

7 Claims, 3 Drawing Figures

COMPUTER-CONTROLLED SWITCHING APPARATUS

BACKGROUND OF THE INVENTION

1. Field of the Invention

The invention relates to a computer-controlled switching apparatus for controlling power switching elements such as relays, motor protection switches or the like, for controlling devices or installations, in which a microprocessor is connected by way of analog-digital converters to at least one sensor, for monitoring the current consumption of the apparatus to be monitored, for example a motor, transformer or the like, the sensor possibly being disposed in the housing of the switching apparatus, and computes characteristic data in accordance with at least one given model and produces switching instructions when parameters rise above or fall below given predetermined values.

2. Description of the Prior Art

A switching element of that kind is known for example from DE-AS No. 26 09 654. In that arrangement, the computer, in accordance with the current values detected, calculates the temperature of the apparatus to be monitored, compares same with a predetermined value and, if necessary, produces a release or triggering signal.

The disadvantage of that known switching apparatus is that it displays the operating condition of the monitored apparatus, at best in regard to the switching condition. In addition, it only provides for a display of the switching condition at the switching apparatus.

However, for larger and more complex installations, it is desirable also to be able to detect the load and temperature condition of the various pieces of equipment being monitored, at a central location. In such an arrangement however, information is to be extracted with the minimum number of lines, in particular main current lines.

SUMMARY OF THE INVENTION

The aim of the present invention is to propose a switching apparatus of the kind set forth above, which also permits remote display of various data characterising the operating condition of the apparatus to be monitored.

According to the invention, that is achieved in that the microprocessor sequentially determines values, from the data detected by the sensors for detecting the current in each connection, leading to a current source, of the apparatus to be monitored, in accordance with various models, i.e. computer programs, and compares said determined values with preselectible limit and/or warning values, and that the microprocessor includes a coding means which address-codes the calculated values, and outputs them at an output which is connected by way of a transmission path to a display means which has a decoder which is possibly formed by a microprocessor, which display means possibly also has warning and acknowledgement means.

In that way, it is possible for the apparatus to be monitored, to be monitored not only in regard to the rise in temperature thereof, but also in regard to other possible defects or errors or undesired operating conditions such as unequal phase loading, underloading or the like, and to activate warning display means or trigger switching off of the installation. In addition, the arrangement permits remote display of the respective operational values such as for example temperature, the individual phase currents and the like, information being taken out by means of a maximum of two transmission lines which are substantially non-critical in regard to their resistance, so that it is also possible to provide a display over substantial distances. In addition, by virtue of the above-indicated arrangement, the switching apparatus may be arranged near to the current converters or they may also be installed in the switching apparatus itself, thereby making it possible to have a very low-resistance loading for the current converters, without particular expenditure.

A further feature of the invention provides that the microprocessor, besides the calculated values, also outputs address-coded signals which characterise the operational condition and which possibly also characterise the inputted nominal and limit values.

By virtue of that arrangement, it is also possible for example to display the cause of a disconnection, for example due to unequal phase loading or underloading or the like, or to be able to interrogate the values inputted into a given switching apparatus, including from a central switching control station.

In this connection, it is particularly advantageous if the display means has a control means which is possibly integrated into a microprocessor and which can be supplied with instruction signals by way of a switching element, for example a pushbutton switch, and which switches through to the display means, signals provided with a selected code. That arrangement makes it possible, with a single display, to provide the extension on which widely varying data can be selectively displayed.

A preferred embodiment of the invention provides that the display means has two interconnected signal switching means of which one switches through the incoming coded signals, in accordance with the code, to one of a plurality of outputs, and the second selectively connects to its output, one of the inputs connected to the outputs of the first signal switching means, wherein a control input of said signal switching means is connected to an instruction generator. With that arrangement, the fact that given coded signals are switched through may be very easily displayed.

Another embodiment is distinguished in that connected to given connections between the signal switching means are circuits for activating warning display means and for switching said connection through to the display means. In that way it is possible to activate warning display means, irrespective of the signals which are switched through at the time to the display means, when given values are attained.

In this connection, it may be provided that the circuit for activating a warning display means has a comparison circuit, the output of which is connected to an AND-gate directly and by way of a timing means, the operating time of which is longer than the period of time between the input of signals having the same address code, the output of the AND-gate being connected to the control input of the signal switching means disposed on the input side of the display means, and the two inputs of the AND-gate being connected to a flip-flop for controlling the warning display means, wherein the output of the timing means is connected to the reset input of the flip-flop, wherein preferably the timing means which is disposed on the input side of the AND-gate is formed by a retriggerable monostable multivibrator and preferably a time delay means disposed upstream of the input thereof. That arrangement ensures that, when a given value is reached, for example the attainment of 90% of the maximum admissible temperature, the warning display is activated and deactivated again upon a corresponding change in such values.

BRIEF DESCRIPTION OF THE DRAWINGS

The invention will now be described in greater detail with reference to the drawings in which.

DESCRIPTION OF THE PREFERRED EMBODIMENT

Figure 1:
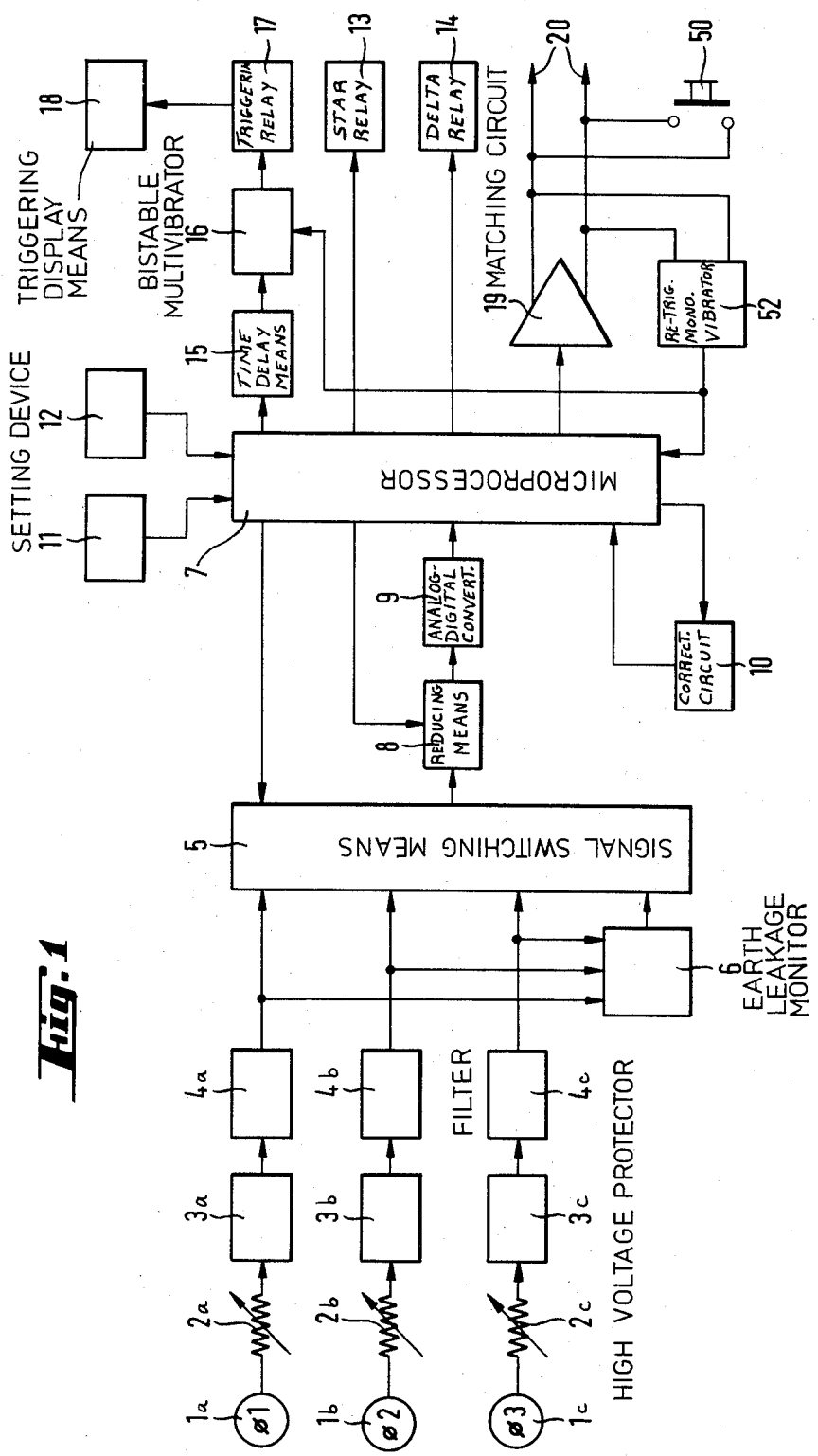
FIG. 1 shows a block circuit diagram of the switching apparatus according to the invention.
Figure 2:
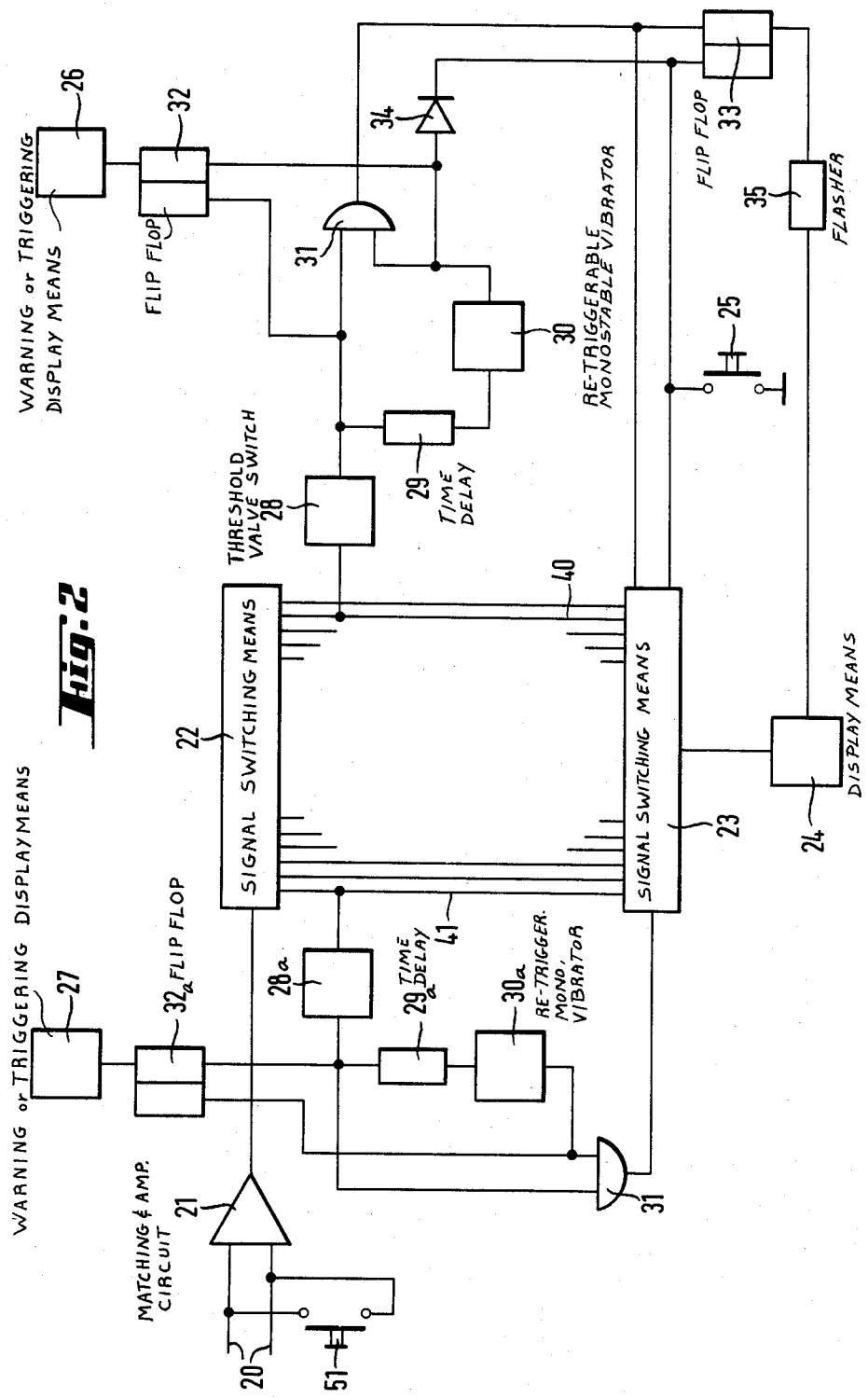
FIG. 2 shows a block circuit diagram of an associated display means.

Referring to FIG. 1, the switching apparatus comprises three current converters 1a, 1b and 1c which are connected by way of adjusting resistors 2a, 2b and 2c and protective means 3a, 3b and 3c for protection against excess voltages, and filters 4a, 4b and 4c, to a signal switching means 5 and an earth leakage monitoring circuit 6. That circuit geometrically adds the signals coming from the current converters 1(a-c) corresponding to the phase currents, and is connected at its output to the signal switching means 5.

The control input of the signal switching means 5 is connected to a microcomputer 7 and in operation is controlled thereby in such a way that the inputs of the signal switching means 5 are individually switched through to the output. The signals which are switched through to the output of the signal switching means 5 are passed to a reducing means 8 which is controlled by the microprocessor 7 and which, in accordance with its mode of control, reduces the analog signals by a given factor, for example 1:10, or simply switches them through from its input to the output. By virtue of that arrangement, it is possible to process signals, the amplitudes of which vary widely, thereby providing for a very broad range of use of the switching apparatus.

The signals from the controllable reducing means 8 are passed by way of an analog-digital converter 9 to the microcomputer 7 to which there is also connected a correction circuit 10 which compensates for the measurement errors caused by deviations of the current converters 1(a-c) from a linear condition.

From the incoming data, and in accordance with various models or programs, the microcomputer 7 sequentially computes values such as for example the rise in temperature of a motor, as a percentage of the maximum admissible rise in temperature, in which connection, for that purpose, it is advantageous only to use the two highest phase currents, for calculating that value. That also provides that the rise in temperature of the windings which are most heavily loaded is calculated. The computer also calculates other values, for example the average current or the like, and compares the calculated values to predetermined warning and limit values which can be inputted by means of two setting devices 11 and 12. Thus for example the setting device 12 can be used to set the nominal or rated current of the piece of equipment to be protected, while the setting device 11 can provide for the input of codes which correspond to the operating conditions such as start-up conditions, limits in respect of protection from underloading, and phase unevenness, and which are characteristic of given triggering curves, wherein such data establish the corresponding warning and triggering limit parameters.

The microcomputer 7 also controls a star-delta start-up of a motor, wherein, by continuously detecting the phase currents, it is possible to detect the moment at which the currents fall below a given value, and the star relay 13 can be cut out, wherein, after the currents have dropped to zero, the delta relay 14 can be cut in. In this way, the arrangement can provide for rapid and reliable starting, while reliably avoiding the danger of a short circuit.

The values computed by the microcomputer 7 are compared to warning and limit values which are established by the data inputted by means of the input devices 11 and 12.

When a limit value is exceeded, a triggering signal is produced, which is passed by way of a time delay means 15 to a bistable multivibrator 16 which is switched thereby, whereby the triggering relay 17 is operated and the apparatus to be protected is disconnected from the main network and a triggering display means 18 is activated.

Signals characterising the calculated values and any triggering action and the cause thereof and the data set at the switching apparatus are passed sequentially and bearing an address code by way of a matching circuit 19 and transmission lines 20 to the display means. In the display means, the coded digital signals are passed by way of a matching and amplifier circuit 21 to a signal switching means 22 which switches the incoming signals through to a given output, in accordance with the code of the signals.

Figure 3:
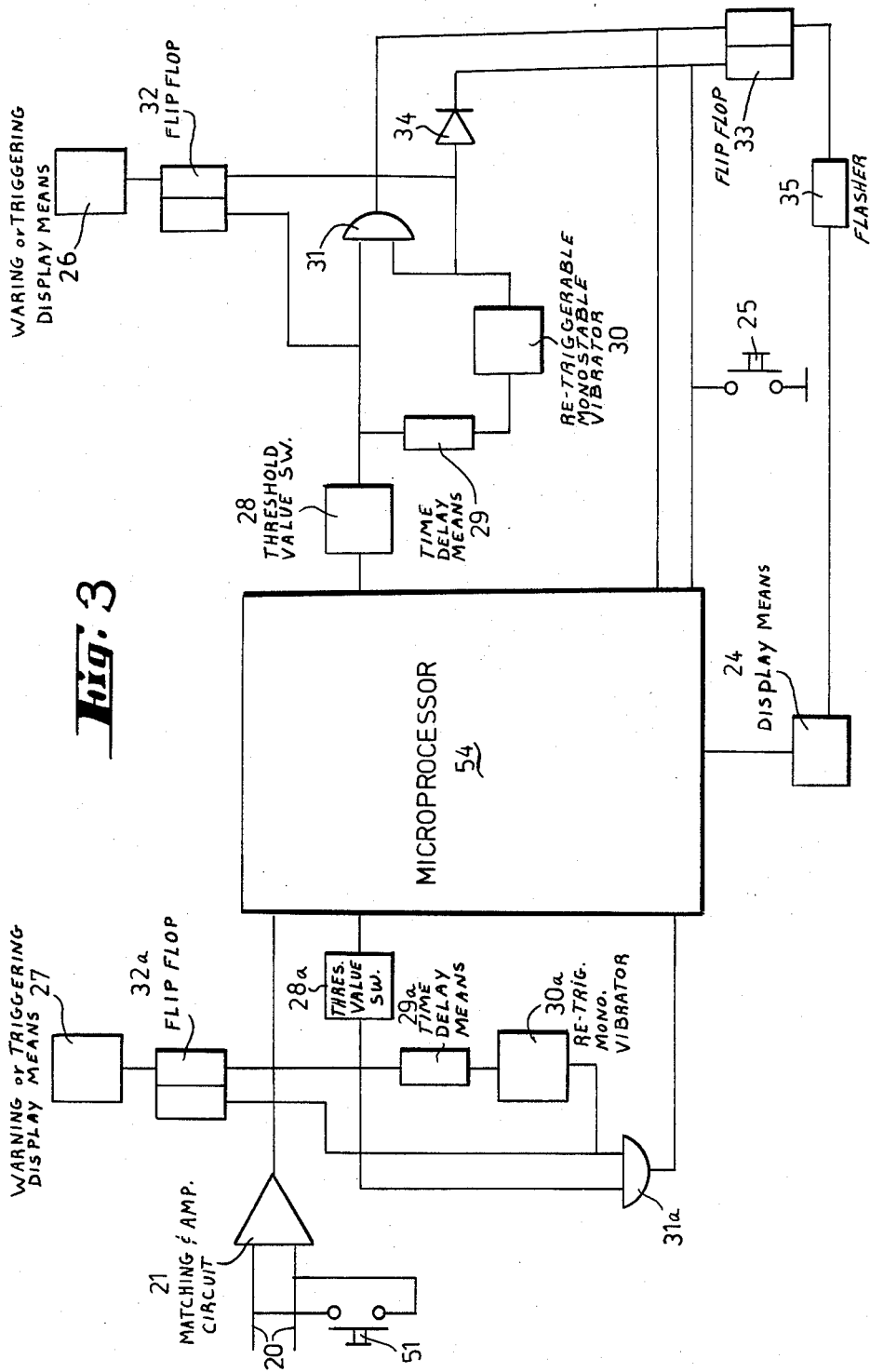
FIG. 3 shows a block diagram of another embodiment of the display means of FIG. 2.

The outputs of the signal switching means are connected to the inputs of a further signal switching means 23 which connects one of its inputs to the output to which the display means 24 is connected. Each pulse produced by means of the pushbutton switch 25 causes the respective next input of the further signal switching means 23 to be switched through to the output thereof. Switching means 22 and 23 may also be incorporated in a microprocessor, designated 54, as clearly seen in FIG. 3.

Connected to the output of the signal switching means 22, which is provided for transmission of the signals characterising a possible triggering action and the reason therefor, and to the output thereof, which is provided for transmission of the signals indicating the rise in temperature of the piece of equipment being monitored, is a respective circuit for activating a warning or triggering display means 26 or 27 respectively and for switching those signals through to the display means 24.

Each of those circuits comprises a threshold value switch 28 with given reference values, for example 90% of the admissible rise in temperature, being inputted thereinto. The output of the switch 28 is connected to the inputs of an AND-gate 31 directly and by way of a time delay means 29 and a retriggerable monostable multivibrator 30. In its rest condition, the multivibrator 30 produces an L-signal and is switched by a signal from the switch 28, corresponding to the situation where the preset threshold value is exceeded. The operating time of the multivibrator 30 is significantly longer than that period of time in which the corresponding signal blocks are produced by the microcomputer 7, for example, the time after which signals corresponding to the rise in temperature of the apparatus being monitored are again produced by the microcomputer. The delay time of the time delay means 29 is very short and serves only to ensure a clear switching sequence.

The switch 28 is also connected to a flip-flop 32, the reset input of which is connected to the output of the monostable multivibrator 30 and which controls the warning or triggering display means 26 and 27, for example lamps or light emitting diodes of different colours.

The output of each AND-gate 31 is connected to an associated control input of the signal switching means 23 which, when a pulse is received on that control input, switches a given input through to the output.

When now signals which are above the reference value of the threshold switch 28 are applied to the input thereof, it produces at its output an L-signal which is passed to the AND-gate 31, at the second input of which there is also an L-signal supplied by the multivibrator 30 which is still in the rest condition. Therefore, that gate outputs a signal to the signal switching means 23 and the latter switches the input monitored by the respective threshold switch 28 through to the output of the signal switching means and thus to the display means 24.

After the timing delay of the time delay means 29 has expired, the multivibrator 30 changes its switching condition, whereby the corresponding flip-flop 32, the setting input of which also receives the L-signal supplied by the switch 28, switches over, and the warning or triggering display means 26 and 27 is activated.

When now for example the temperature of the apparatus being monitored falls or if the switching apparatus, after a triggering process, which will be described in greater detail hereinafter, is reset, then no signals above the threshold value reach the threshold value switch 28 and the switch therefore no longer triggers the multivibrator 30 so that the multivibrator 30 switches back and resets the flip-flop 32, whereby the display means 26 or 27 respectively is deactivated.

A further flip-flop 33 is also connected to the AND-gate 31 which is controlled by the threshold value switch 28 connected to the connecting line 40 which carries the signals corresponding to the rise in temperature of the apparatus being monitored. The reset input of the further flip-flop 33 is connected by the pushbutton switch 25 and by way of a decoupling diode 34 to the multivibrator 30. The flip-flop 33 controls a flasher 35 which is connected to the display means 24 and which switches the display means to a flashing mode as soon as an L-signal appears at the output of the corresponding AND-gate 31.

If, after activation of the flasher 35, the pushbutton 25 is pressed, the flip-flop 33 is reset and at the same time the next input of the signal switching means 23 is switched through to the output thereof, whereby the display which exceeds the warning value disappears. However, the warning display means 26 remains activated nonetheless and disappears only when the corresponding value, for example the rise in temperature of the apparatus being monitored, has dropped accordingly.

In the event of triggering of the switching apparatus due to a limit value being exceeded, the triggering display means 27 of the display arrangement is activated by way of the circuit connected to the line 41, more specifically, the threshold value switch 28a, the time delay means 29a, the monostable multivibrator 30a, the AND-gate 31a and the flip-flop 32a, and at the same time the signals applied to the signal switching means 23 by way of the line 41 are switched through to the output thereof, and thus to the display means 24. In this case also, the signal switching means 23 can be switched on, by pressing the pushbutton switch 25, whereby other information is displayed. In that case also, the triggering display means 27 remains activated and is only extinguished when the switching apparatus is reset and therefore there are no longer any signals corresponding to a triggering operation, arriving at the display arrangement.

Resetting of the switching apparatus after a triggering procedure is effected by pressing the pushbutton switch 50 contained in the switching apparatus, or even the pushbutton switch 51 in the display arrangement. That causes the two lines 20 to be short circuited, and no signals pass to the retriggerable monostable multivibrator 52 so that the multivibrator 52 switches back into its rest condition and produces at its output a signal which resets the multivibrator 16, whereby the triggering switching means 17 is deactivated and at the same time the cause of triggering, stored in the microcomputer 7, is erased.

I claim:

1. A computer-controlled switching apparatus for controlling power switching elements supplying power to a system such as a motor, transformer or the like, according to various computer programs for said system, said apparatus comprising:
   (a) at least one sensor for monitoring the current consumption of the system;
   (b) a microprocessor connected to said at least one sensor through an analog-digital converter, said microprocessor sequentially computes from the signals supplied by said at least one sensor, according to the various programs, data representing parameters of the system and compares the computed data with pre-selected limit and warning values to produce switching instructions and warning signals when said values are achieved;
   (c) a coding means included in said microprocessor for coding the computed data and output the same to an output;
   (d) a decoder connected to the output of said coding means through a transmission path for switching the computed data corresponding to one of the programs through to a display means, said decoder including two interconnected signal switching means of which one switches through the incoming coded signals, in accordance with the code, to one of a plurality of outputs, and the second selectively connects to its output, one of the inputs connected to the outputs of the first signal switching means, the output of said second switching means is connected to said display means; and
   (e) a manually operated instruction signal generator for supplying a switching signal to said decoder to change the switched-through data to that corresponding to another one of the programs, said second signal switching means having a control input connected to said instruction signal generator.

2. A switching apparatus according to claim 1, wherein said decoder is a microprocessor.

3. A switching apparatus according to claim 1, wherein circuits are connected to said second switching means, warning means and given connections between the two signal switching means for activating said warning means and for switching said connection through to the display device when the respective warning means is activated.

4. A switching apparatus according to claim 3, wherein the circuit for activating a warning display means has a comparison circuit, the inputs of which are connected to a reference value and a said given connection and the output of which is connected to an AND-gate directly and by way of a timing means, the operating time of said timing means is longer than the period of time between the input of signals having the same address code, the output of the AND-gate is connected to the control input of the second signal switching means, and the two inputs of the AND-gate are connected to a flip-flop for controlling the warning display means, wherein the output of the timing means is connected to the reset input of the flip-flop.

5. A switching apparatus according to claim 4, wherein the timing means which is disposed on the input side of the AND-gate is formed by a retriggerable monostable multivibrator.

6. A switching apparatus as claimed in claim 5, which further includes time delay means disposed upstream of the input of said retriggerable monostable multivibrator.

7. A switching apparatus as claimed in claim 6, wherein the activating circuits are connected to further control inputs of the second signal switching means.

* * * * *